(No Model.) 3 Sheets—Sheet 2.

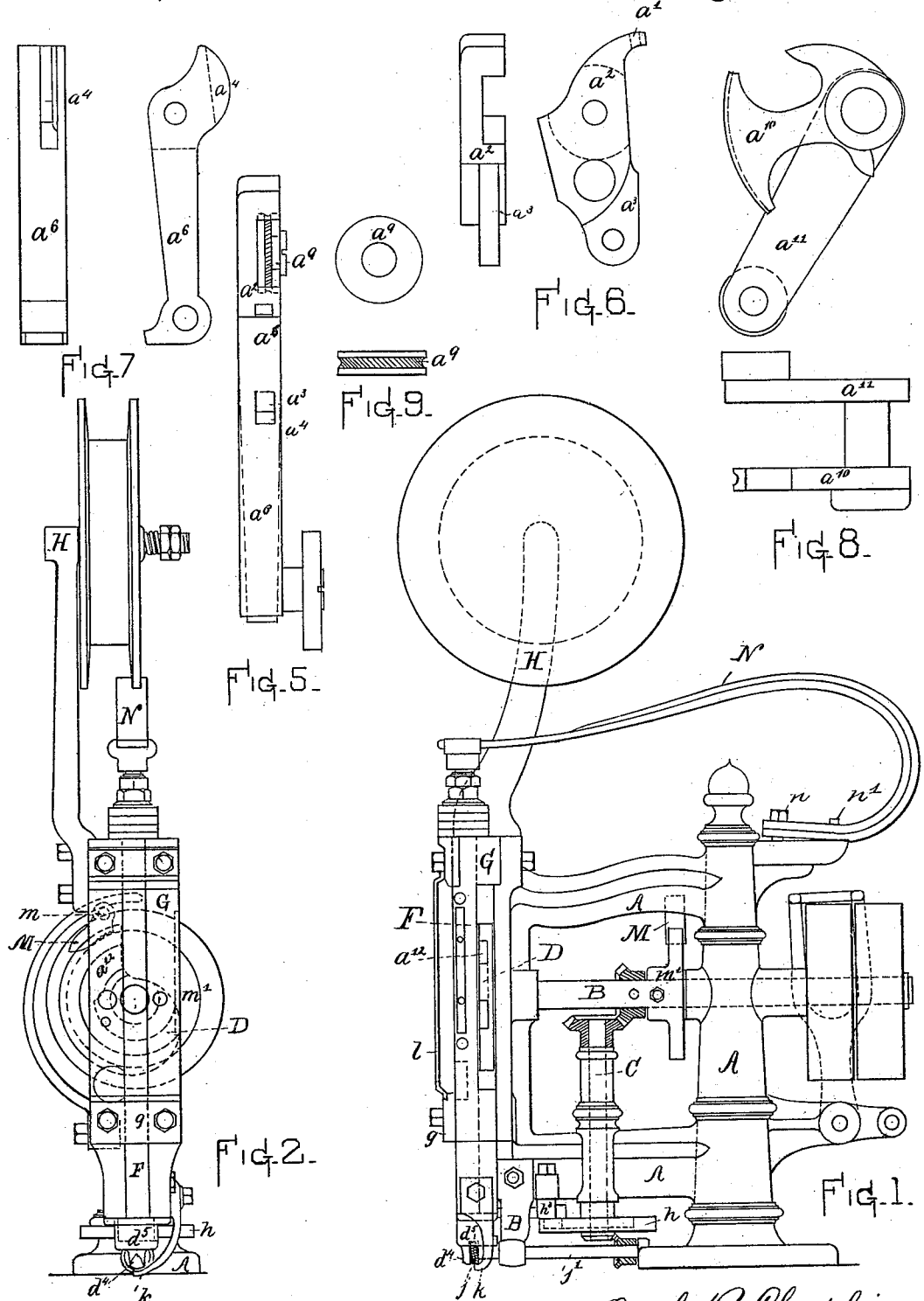

O. R. CHAPLIN.
Machine for Driving Sole Fastenings.

No. 231,149. Patented Aug. 17, 1880.

(No Model.) 3 Sheets—Sheet 3.
O. R. CHAPLIN.
Machine for Driving Sole Fastenings.
No. 231,149. Patented Aug. 17, 1880.
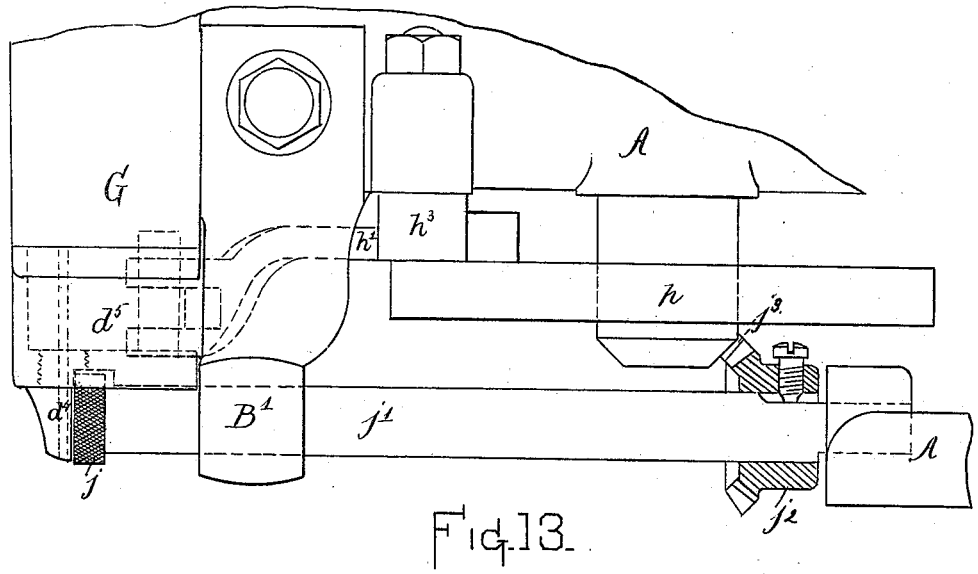
Fig. 13.
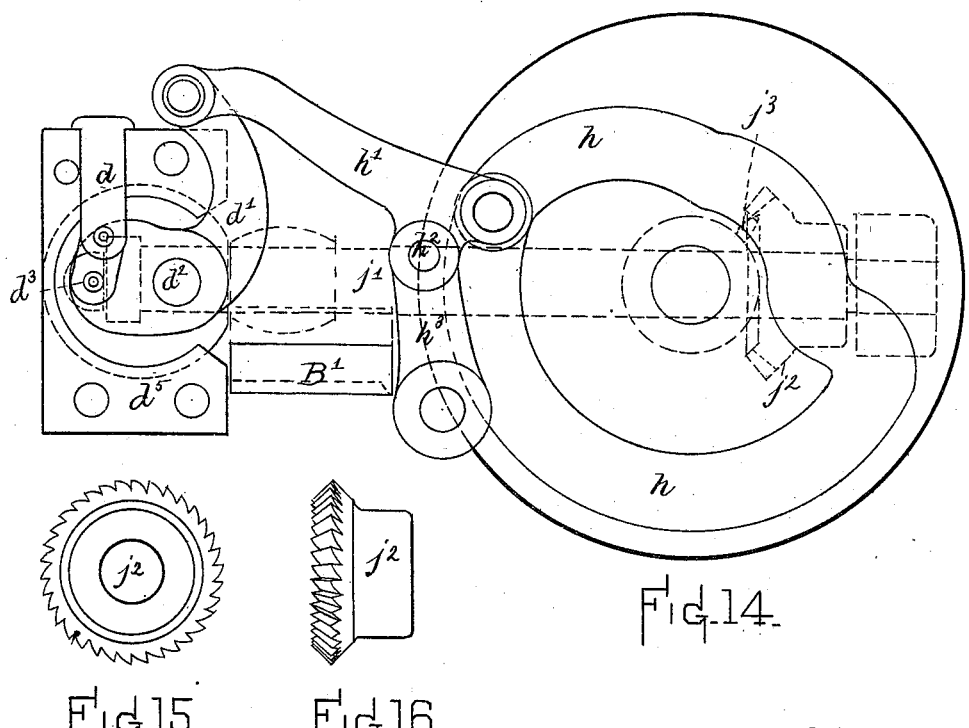
Fig. 14.
Fig. 15. Fig. 16.

UNITED STATES PATENT OFFICE.

ORRIL R. CHAPLIN, OF BOSTON, MASSACHUSETTS, ASSIGNOR, BY MESNE ASSIGNMENT, TO FLEXIBLE SHOE FASTENING MACHINE COMPANY.

MACHINE FOR DRIVING SOLE-FASTENINGS.

SPECIFICATION forming part of Letters Patent No. 231,149, dated August 17, 1880.

Application filed June 26, 1880. (No model.)

*To all whom it may concern:*

Be it known that I, ORRIL R. CHAPLIN, of Boston, in the county of Suffolk and State of Massachusetts, have invented an Improved Machine for Driving Wire Sole-Fastenings, of which the following is a full, clear, concise, and exact description, reference being had to the accompanying drawings, forming a part hereof, of which—

Figure 3:
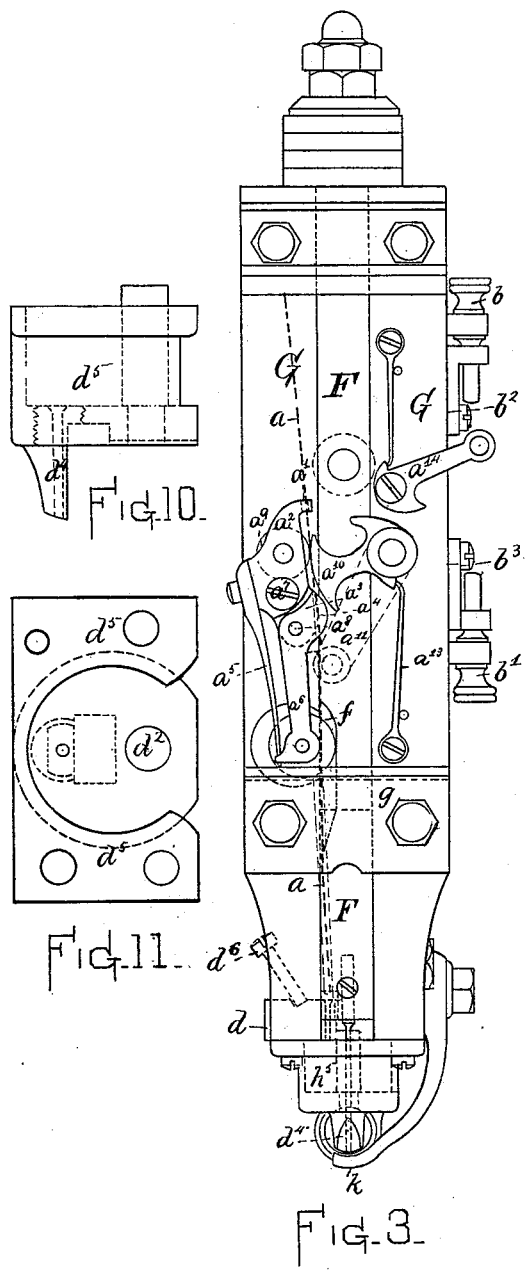
Figure 4:
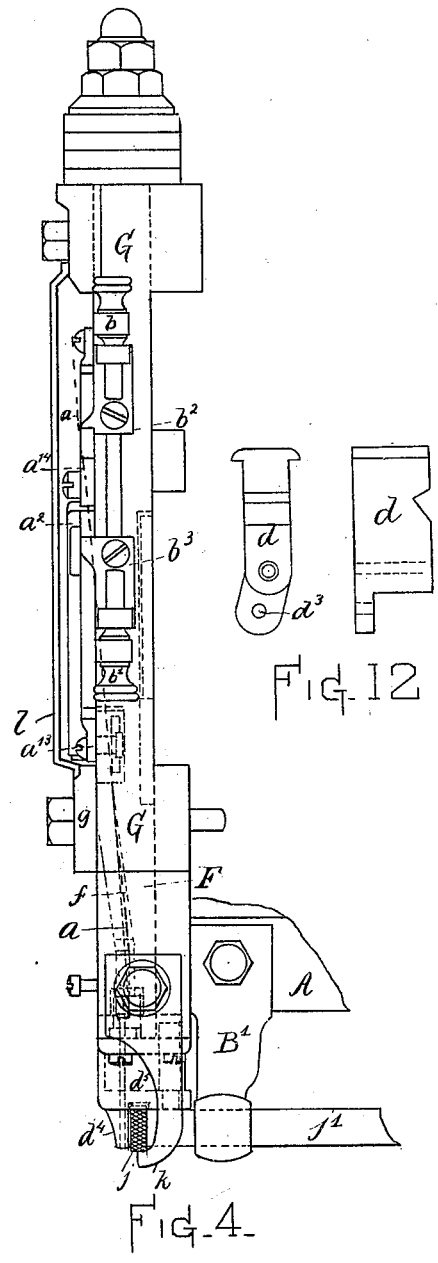
Figure 10:
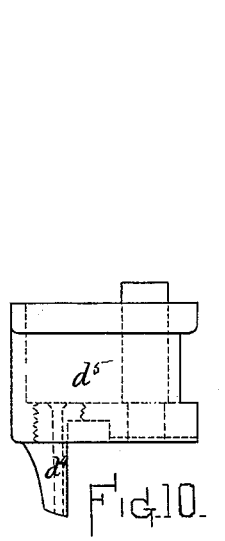
Figure 11:
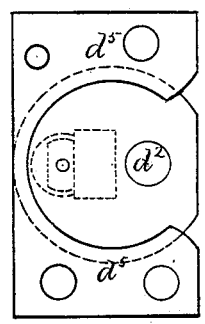
Figure 12:
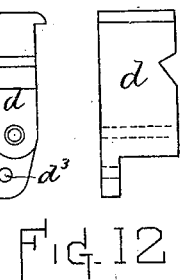

Figure 1 is a side, and Fig. 2 a front elevation, of the upper frame of the machine, with some of the parts omitted for greater clearness. Figs. 3 and 4 are side and front views of the head of the machine detached. Figs. 5, 6, 7, 8, 9, and 10 are details. Fig. 11 is a plan of the throat-carrier. Fig. 12 is a detail view of the upper cutter. Fig. 13 is a side view of the feed mechanism and the wire-cutting mechanism, showing also a side view of the throat and its carrier. Fig. 14 is a view showing the cutter-lever and its actuating mechanism, in connection with the upper cutter and throat-carrier. Figs. 15 and 16 are details of the ratchet-wheel for driving the feed-shaft.

The frame A is mounted upon a suitable pedestal, (not shown,) such as is in common use in pegging and other sole-fastening machines. This frame carries the main shaft B and the minor shaft C.

On the main shaft B is the cam D, by which the driver-bar F is raised in the usual way. The driver-bar is thrown down by a spring also in the usual way. The driver-bar F slides in ways in the head G, which is fast to frame B.

The wire $a$ is supported on a reel or arm, H, and its end is carried down through the eye $a'$ in arm $a^2$ and between the feed-wheel $a^9$ and feed-lever $a^{10}$, and also between the clamps $a^3$ $a^4$, by which it is held firmly by the stress of the spring $a^5$, fastened to arm $a^2$, so long as the friction-roll on arm $a^6$ is not in contact with the driver-bar F.

It will be seen that the arms $a^2$ $a^6$ and spring $a^5$ constitute a compound lever and clamp, and that a slide acting on the roll on arm $a^6$ in one direction will turn this compound lever $a^2$ $a^6$ $a^5$ on its fulcrum $a^7$, and will also tend to separate clamp $a^4$ on arm $a^6$ from clamp $a^3$ on arm $a^2$ by tending to turn arm $a^6$ on its fulcrum $a^8$, and as soon as this compound lever $a^2$ $a^6$ $a^5$ has been turned far enough on its fulcrum $a^7$ to bring the feed-wheel $a^9$ to bear on the wire between it and the segmental arm $a^{10}$ of the feed-lever any further motion of the roll on arm $a^6$ will turn $a^6$ on its fulcrum $a^8$, and thereby release the arm from clamp $a^3$ $a^4$, and leave it ready to be fed by the feed-wheel $a^9$ and arm $a^{10}$ of the feed-lever.

The compound lever $a^2$ $a^6$ $a^5$ is actuated by the driver-bar F, which is cut away at $f$, so as to leave the roll on arm $a^6$ free from the driver-bar when the bar descends far enough and during a portion of the movement of the driver-bar. When the roll on arm $a^6$ is free from the driver-bar the wire is firmly clamped between clamps $a^3$ $a^4$; but as soon as the incline at the bottom of $f$ strikes the roll on arm $a^6$ the compound lever $a^2$ $a^6$ $a^5$ is turned on its fulcrum $a^7$ far enough to press feed-roll $a^9$ against feed-lever $a^{10}$, and the wire is again clamped between the feed-roll and feed-lever and released from clamp $a^3$ $a^4$.

Feed-lever $a^{10}$ $a^{11}$ is moved in one direction by the groove-cam $a^{12}$, cut in the surface of the driver-cam D, and in the other direction by spring $a^{13}$, this groove-cam acting on a wrist on arm $a^{11}$ of feed-lever $a^{10}$ $a^{11}$.

The extent of the return movement of arm $a^{10}$ is regulated by the stop-lever $a^{14}$, which can be set to make this return movement more or less, and thereby vary the length of the wire pegs.

The thumb-screws $b$ $b'$ and slides $b^2$ $b^3$ are used to determine the throw of stop-lever $a^{14}$.

Two lengths of fastenings are usually all that is necessary, and the slides $b^2$ $b^3$ are set so that when stop-lever $a^{14}$ is in contact with slide $b^2$ the shortest fastenings are cut and driven, and when in contact with $b^3$ the longest. A treadle (not shown) is used in practice for moving stop-lever $a^{14}$.

The wire is fed down under cross-piece $g$, (a portion of one side of the driver-bar being cut away, as shown in Figs. 3 and 4, to prevent the driver-bar from interfering with the wire and the stationary cutter $d$,) through the hole in the stationary cutter $d$, and into the hole in the cutter-lever $d'$, these two holes being in line when the wire is fed. After the wire has entered the hole in cutter-lever $d'$ that cutter is moved on its fulcrum $d^2$ to bring the severed wire peg in line with the hole $d^3$ in the upper cutter, $d$, and also in line with the throat $d^4$ and directly under the driver.

The throat $d^4$ is secured into the throat-carrier $d^5$, and this throat-carrier has a circular recess in it to receive the cutter-lever $d'$ and its fulcrum $d^2$.

The throat-carrier $d^5$, with the cutter-lever $d'$ in it, is bolted fast to the under side of head G.

The cutter $d$ is held firmly in its place by the set-screw $d^6$.

The cutter-lever $d'$ is moved by the groove-cam $h$ by means of the connecting-lever $h'$, whose fulcrum $h^2$ is in the link $h^3$, which is fast to frame A, as is clearly shown in Figs. 13 and 14. This cam $h$ is fast to shaft C, which is revolved by bevel-gearing connecting it with shaft B.

The shoe-feed shown in the drawings is a roughened wheel, $j$, mounted on shaft $j'$, whose bearings are in frame A and in bracket B', bolted to frame A. This shaft $j'$ is revolved by the ratchet-wheel $j^2$, fast to it, and this wheel $j^2$ is moved by the tooth $j^3$, fast to shaft C.

The teeth on wheel $j^2$ are of peculiar form, which is clearly shown in Figs. 15 and 16.

The length of feed is varied by shifting wheel $j^2$ on its shaft, so that tooth $j^3$ will take later and leave sooner, thereby making a shorter feed, the greatest feed being when wheel $j^2$ is as near shaft C as it can go. The edge-guide is marked $k$.

The face $l$ is held at the bottom by a dovetail, and at the top by a screw or button, so that it is easily detached to get at the wire-feed mechanism.

M is a brake-shoe to prevent the shaft B from revolving in the wrong direction, and by means of this brake the machine can be stopped at any part of its revolution. This brake-shoe hangs from its pin $m$ and rests upon the periphery of wheel $m'$. Its acting-surface is roughened at the biting-point. If the machine were stopped with the driver not quite up to its full height, the spring of the driver-bar would force the driver-cam backward were it not for the brake-shoe M and its wheel $m'$.

The driver-spring N is mounted upon frame A by means of pin $n'$, which passes through a hole in the spring N, and the spring N is so shaped that only a small portion of it is in contact with frame A, that portion being close to pin $n'$, and the hole in spring N through which pin $n'$ passes is considerably larger than the pin $n'$, so that the spring N can be rocked on frame A when screw $n$ is not in place, the office of pin $n'$ being simply to hold spring N from motion sidewise. This pin $n'$ does not prevent the rocking motion of spring N. When the spring N is on the frame A, with pin $n'$ passing through spring N, it will be seen that a rocking motion, which moves the butt-end of spring N, though a very few degrees, will give a very much greater motion to the smaller end of spring N, and that a small motion of screw $n$ in or out will greatly increase or diminish the effective force of spring N on the driver-bar. Moreover, the whole of spring N from end to end is effective when arranged to rock on frame A, as shown, while in all other machines of this class the larger end of the driver-spring was used only as a means of connecting it with the frame, the surface-contact between the frame and spring being considerable, and no provision being made for rocking the spring on its frame, which is the distinguishing characteristic of this part of my invention. A spring arranged in this way will operate in a substantially different manner from springs as commonly used heretofore in this class of machines, where the butt of the spring for nearly one-quarter of the whole length of the spring was held down against the frame, for the ascent of the driver-bar will cause the butt of spring N to press upward against the head of screw $n$, and will also cause the under surface of spring N, near pin $n'$, to press down upon the frame, and this pressure downward is wholly new.

The operation is as follows: The shoe, properly jacked or supported, is presented under the throat, the point where the first wire peg is to be inserted being directly under the throat. The belt is then shifted from the loose to the fast pulley, and the driver descends and drives the first fastening. As soon as this driver has left the hole in the cutter-lever $d'$ that lever is thrown back by its cam $h$ and its hole brought into line with the hole in cutter $d$. The wire is then fed as before described, and as soon as the wire is fed the cutter-lever $d'$ is thrown forward by its cam $h$, bringing its hole and the fastening in it under the driver. The shoe is fed while the driver is rising by the partial revolution of wheel $j$, caused by the engaging of tooth $j^3$ with wheel $j^2$, as before described.

What I claim as my invention is—

1. The mechanism for feeding and holding the wire, consisting of the compound lever $a^2$ $a^6$ $a^5$, with its clamp $a^3$ $a^4$, and feed-wheel $a^9$, in combination with the feed-lever $a^{10}$ $a^{11}$, substantially as described.

2. In combination with the wire-feed mechanism described, the stop-lever $a^{14}$ and its adjusting-slides $b^2$ $b^3$, for regulating the motion of the stop-lever, substantially as described.

3. The wire cutting and carrying mechanism consisting of the stationary cutter $d$ and cutter-lever $d'$, operated by cam $h$, in combination with the driver and throat, substantially as described.

4. In combination, feed-wheel $j$, shaft $j'$, ratchet-wheel $j^2$, and revolving tooth $j^3$, substantially as described.

5. In combination, throat $d^4$, throat-carrier $d^5$, and cutter-lever $d'$, the throat-carrier being chambered, as shown, to receive the cutter-lever $d'$, substantially as described.

6. In combination, stationary cutter $d$, cutter-lever $d'$, connecting-lever $h'$, link $h^3$, and groove-cam $h$, substantially as described.

7. In a nailing-machine whose driver-bar is raised by a cam and thrown down by a spring, the brake-shoe M and wheel $m'$, in combination with the shaft B, carrying the driver-cam G, all substantially as and for the purpose specified.

8. In a nailing-machine, the spring N, in combination with frame A, adjusting-screw $n$, and pin $n'$, the spring being arranged to rock upon the frame and held down only by the screw $n$, the pin $n'$ preventing sidewise motion of the spring, but not preventing its rocking motion, and the butt of the spring being out of contact with the frame, all as set forth.

9. In a nailing-machine, the two shafts B and C, at right angles to each other, one actuating the driver and wire-feed, the other actuating the cutter, substantially as described.

ORRIL R. CHAPLIN.

Witnesses:
J. E. MAYNADIER,
J. R. SNOW.